United States Patent
Ho et al.

(10) Patent No.: US 10,740,678 B2
(45) Date of Patent: Aug. 11, 2020

(54) CONCEPT HIERARCHIES

(71) Applicant: International Business Machines Corporation, Armonk, NY (US)

(72) Inventors: Tin Kam Ho, Millburn, NJ (US); Luis A. Lastras-Montano, Cortlandt Manor, NY (US); Oded Shmueli, New York, NY (US); Livio Soares, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 15/086,576

(22) Filed: Mar. 31, 2016

(65) Prior Publication Data

US 2017/0286835 A1    Oct. 5, 2017

(51) Int. Cl.

| | |
|---|---|
| *G06N 5/02* | (2006.01) |
| *G06F 16/36* | (2019.01) |
| *G06F 40/30* | (2020.01) |
| *G06F 16/332* | (2019.01) |
| *G06N 3/08* | (2006.01) |
| *G06F 40/247* | (2020.01) |
| *G06N 20/10* | (2019.01) |

(52) U.S. Cl.
CPC ........... *G06N 5/02* (2013.01); *G06F 16/3329* (2019.01); *G06F 16/367* (2019.01); *G06F 40/247* (2020.01); *G06F 40/30* (2020.01); *G06N 3/08* (2013.01); *G06N 20/10* (2019.01)

(58) Field of Classification Search
None
See application file for complete search history.

(56) References Cited

U.S. PATENT DOCUMENTS

| | | | |
|---|---|---|---|
| 9,348,920 B1 * | 5/2016 | Kesin | G06F 16/334 |
| 2003/0217335 A1 * | 11/2003 | Chung | G06F 17/2785 |
| | | | 715/206 |
| 2004/0059736 A1 * | 3/2004 | Willse | G06F 17/27 |

(Continued)

FOREIGN PATENT DOCUMENTS

AU    2017203989 A1 *    7/2017    ............... G06N 5/02

OTHER PUBLICATIONS

Steinbach, Michael, George Karypis, and Vipin Kumar. "A comparison of document clustering techniques." In TextMining Workshop at KDD2000 (May 2000). (Year: 2000).*

(Continued)

*Primary Examiner* — Alexey Shmatov
*Assistant Examiner* — Casey R. Garner
(74) *Attorney, Agent, or Firm* — Terrile, Cannatti & Chambers, LLP; Michael Rocco Cannatti

(57) ABSTRACT

A method and apparatus are provided for generating concept hierarchies in response to a user request to produce a hierarchy of concepts from a first concept set by performing a natural language processing (NLP) analysis comparison of the vector representations of the concepts in the first concept set to determine a similarity measure for each pair of distinct concepts $C_i$ and $C_j$ in the first concept set, and to construct therefrom a concept hierarchy based on one or more specified hierarchy parameters and the similarity measure for each pair of distinct concepts $C_i$ and $C_j$ in the first concept set.

13 Claims, 5 Drawing Sheets

(56) References Cited

U.S. PATENT DOCUMENTS

| | | | | |
|---|---|---|---|---|
| 2013/0346422 A1* | 12/2013 | Jordahl | ............ | G06F 16/24578 |
| | | | | 707/748 |
| 2014/0095478 A1* | 4/2014 | Lamba | ................ | G06F 17/2785 |
| | | | | 707/722 |
| 2014/0250133 A1* | 9/2014 | Adriaansen | ............. | G06F 17/27 |
| | | | | 707/748 |
| 2016/0012122 A1* | 1/2016 | Franceschini | ......... | G06F 16/313 |
| | | | | 707/739 |
| 2016/0232160 A1* | 8/2016 | Buhrmann | .......... | G06F 17/2247 |

OTHER PUBLICATIONS

R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

CONCEPT HIERARCHIES

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI) or application programming interface (API) to the QA system where the questions are processed to generate answers that are returned to the user(s). The QA system generates answers from an ingested knowledge base corpus, including publicly available information and/or proprietary information stored on one or more servers, Internet forums, message boards, or other online discussion sites. Using the ingested information, the QA system can formulate answers using artificial intelligence (AI) and natural language processing (NLP) techniques to provide answers with associated evidence and confidence measures. However, the quality of the answer depends on the ability of the QA system to identify and process information contained in the knowledge base corpus.

With some traditional QA systems, there are mechanisms provided for processing information in a knowledge base by using vectors to represent words to provide a distributed representation of the words in a language. Such mechanisms include "brute force" learning by various types of Neural Networks (NNs), learning by log-linear classifiers, or various matrix formulations. Lately, word2vec, that uses classifiers, has gained prominence as a machine learning technique which is used in the natural language processing and machine translation domains to produce vectors which capture syntactic as well semantic properties of words. Matrix based techniques that first extract a matrix from the text and then optimize a function over the matrix have recently achieved similar functionality to that of word2vec in producing vectors. However, there is no mechanism in place to identify and/or process concepts in an ingested corpus which are more than merely a sequence of words. Nor are traditional QA systems able to identify and process concept attributes in relation to other concept attributes. Instead, existing attempts to deal with concepts generate vector representations of words that carry various probability distributions derived from simple text in a corpus, and therefore provide only limited capabilities for applications, such as NLP parsing, identification of analogies, and machine translation. As a result, the existing solutions for efficiently identifying and applying concepts contained in a corpus are extremely difficult at a practical level.

SUMMARY

Broadly speaking, selected embodiments of the present disclosure provide a system, method, and apparatus for processing of inquiries to an information handling system capable of answering questions by using the cognitive power of the information handling system to generate or extract a sequence of concepts, to extract or compute therefrom a distributed representation of the concept(s) (i.e., concept vectors), and to process the distributed representation (the concept vectors) to carry out useful tasks in the domain of concepts and user-concept interaction. In selected embodiments, the information handling system may be embodied as a question answering (QA) system which has access to structured, semi-structured, and/or unstructured content contained or stored in one or more large knowledge databases (a.k.a., "corpus"), and which extracts therefrom a sequence of concepts from annotated text (e.g., hypertext with concept links highlighted), from graph representations of concepts and their inter-relations, from tracking the navigation behavior of users, or a combination thereof. In other embodiments, concept vectors may also be used in a "discovery advisor" context where users would be interested in seeing directly the concept-concept relations, and/or use query concepts to retrieve and relate relevant documents from a corpus. To compute the concept vector(s), the QA system may process statistics of associations in the concept sequences using vector embedding methods. However generated, the concept vectors may be processed to enable improved presentation and visualization of concepts and their inter-relations and to improve the quality of answers provided by the QA system by providing the ability to generate a hierarchy of concepts using methods based on similarity metrics which may be manipulated to promote synonyms/hypernyms of a certain nature to display one or more concept hierarchies.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
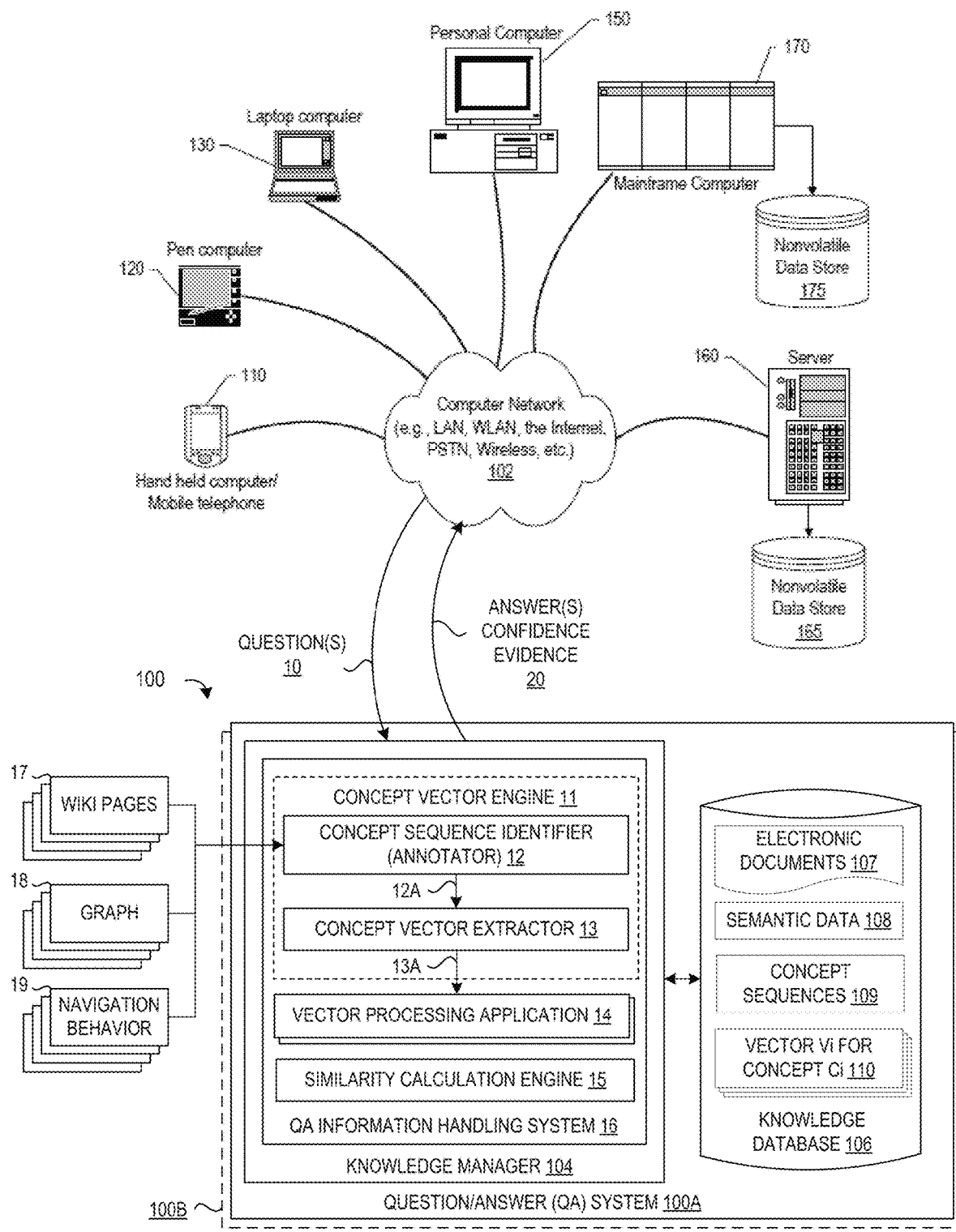
FIG. 1 depicts a network environment that includes a knowledge manager that uses a knowledge base and a vector concept engine for generating concept vectors extracted from the knowledge base and generating concept hierarchies from the extracted concept vectors.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected to a computer network 102 in which the QA system 100 uses a vector concept engine 11 to extract concept vectors from a knowledge database 106 and uses a vector processing application 14 to generate concept hierarchies from the extracted concept vectors. The QA system 100 may include one or more QA system pipelines 100A, 100B, each of which includes a knowledge manager computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, sub-systems, and/or devices other than those that are depicted herein.

In the QA system 100, the knowledge manager 104 may be configured to receive inputs from various sources. For example, knowledge manager 104 may receive input from the network 102, one or more knowledge bases or corpora of electronic documents 106 which stores electronic documents 107, semantic data 108, or other possible sources of data input. In selected embodiments, the knowledge database 106 may include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to questions. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, the content creator creates content in electronic documents 107 for use as part of a corpus of data with knowledge manager 104. Content may also be created and hosted as information in one or more external sources 17-19, whether stored as part of the knowledge database 106 or separately from the QA system 100A. Wherever stored, the content may include any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content 108, the process can use a variety of conventions to query it from the knowledge manager. One convention is to send a question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 100 may be the IBM Watson™ QA system available from International Business Machines Corporation of Armonk, N.Y., which is augmented with the mechanisms of the illustrative embodiments described hereafter for identifying and processing concept vectors which may aid in the process of answering questions. The IBM Watson™ knowledge manager system may receive an input question 10 which it then parses to extract the major features of the question, that in turn are used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 100 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

To improve the quality of answers provided by the QA system 100, the concept vector engine 11 may be embodied as part of a QA information handling system 16 in the knowledge manager 104, or as a separate information handling system, to execute a concept vector identification process that extracts a sequence of concepts from annotated text sources 17 (e.g., sources specializing in concepts, such as Wikipedia pages with concepts highlighted or hyperlinked), from graph representations 18 of concepts and their inter-relations, from tracking the navigation behavior of users 19, or a combination thereof, and to construct therefrom one or more vectors for each concept 110. Syntactically, a "concept" is a single word or a word sequence (e.g., "gravity", "supreme court", "Newton's second law", "Albert Einstein") which becomes a semantic "concept" once it has been designated by a community to have a special role, namely—as representing more than just a sequence of words. In addition, a concept has many attributes: field of endeavor, origin, history, an associated body of work and/or knowledge, cultural and/or historical connotation and more. So, although superficially, words, phrases and concepts seem similar, a word sequence becomes a concept when it embeds a wider cultural context and a designation by a community, encompassing a significant meaning and presence in an area, in a historical context, in its relationships to other concepts and in ways it influences events and perceptions. It is worth emphasizing the point that not every well-known sequence of words is a concept, and the declaration of a sequence of words to be a concept is a community decision which has implications regarding naturally-arising sequences of concepts. With this understanding, the concept vector engine 11 may include a concept sequence identifier 12, such as an annotator, which accesses sources 17-19 for sequences of concepts embedded in texts of various kinds and/or which arise by tracking concept exploration behavior from examining non-text sources, such as click streams. As different concept sequences are identified, the adjacency of the concepts is tied to the closeness of the concepts themselves. Once concept sequences are available, a concept vector extractor 13 acts as a learning device to extract vector representations for the identified concepts. The resulting concept vectors 110 may be stored in the knowledge database 106 or directly accessed by one or more vector processing applications 14 which may be executed, for example, to construct concept hierarchies for display to promote understanding and interpretation of concept vector relationships.

To identify or otherwise obtain a sequence of concepts, a concept sequence identifier 12 may be provided to (i) access one or more wiki pages 17 or other text source which contains these concepts by filtering out words that are not concepts, (ii) algorithmically derive concept sequences from a graph 18 (e.g., a Concept Graph (CG)), (iii) track one or more actual users' navigation behavior 19 over concepts, or some modification or combination of one of the foregoing. For example, the concept sequence identifier 12 may be configured to extract concepts from a text source, but also some text words extracted per concept in the context surrounding the concept's textual description, in which case the concepts are "converted" to new unique words.

To provide a first illustrative example, the concept sequence identifier 12 may be configured to derive concept sequences 12A from one or more Wikipedia pages 17 by eliminating all words from a page that are not concepts (i.e., Wikipedia entries). For example, consider the following snippet from the Wikipedia page for Photonics at en.wikipedia.org/wiki/Photonics in which the concepts are underlined:

Photonics as a field began with the invention of the laser in 1960. Other developments followed: the laser diode in the 1970s, optical fibers for transmitting information, and the erbium-doped fiber amplifier. These inventions formed the basis for the telecommunications revolution of the late 20th century and provided the infrastructure for the Internet.

Though coined earlier, the term photonics came into common use in the 1980s as fiber-optic data transmission was adopted by telecommunications network operators. At that time, the term was used widely at Bell Laboratories. Its use was confirmed when the IEEE Lasers and Electro-Optics Society established an archival journal named *Photonics Technology Letters* at the end of the 1980s.

During the period leading up to the dot-com crash circa 2001, photonics as a field focused largely on optical telecommunications.

In this example, the concept sequence 12A derived by the concept sequence identifier 12 is: laser, laser diode, optical fibers, erbium-doped fiber amplifier, Internet, Bell Laboratories, IEEE Lasers and Electro-Optics Society, Photonics Technology Letters, dot-corn crash. However, it will be appreciated that the concept sequence identifier 12 may examine a "dump" of Wikipedia pages 17 to obtain long concept sequences reflecting the whole collection of Wikipedia concepts.

In another illustrative example, the concept sequence identifier 12 may be configured to derive concept sequences 12A from one or more specific domains. For example, a pharmaceutical company's collection of concerned diseases, treatments, drugs, laboratory tests, clinical trials, relevant chemical structures and processes, or even biological pathways may be accessed by the concept sequence identifier 12 to extract domain-specific concept sequences. In this example, concept sequences may be extracted from company manuals, emails, publications, reports, and other company-related text sources.

In another illustrative example, the concept sequence identifier 12 may be configured to derive concept sequences 12A which also include non-concept text. For example, an identified concept sequence may include inserted "ordinary" or non-concept words which are used for learning. One option would be to use all the words from the original source text by converting "concept" words into "new" words by appending a predetermined suffix (e.g., "_01") to each concept. In the example "Photonics" page listed above, this approach would lead to the following first paragraph: "Photonics as a field began with the invention of the laser 01 in 1960. Other developments followed: the laser diode 01 in the 1970s, optical fibers 01 for transmitting information, and the erbium-doped fiber amplifier 01. These inventions formed the basis for the telecommunications revolution of the late 20th century and provided the infrastructure for the Internet 01."

Another option for deriving concept sequences with text would be to process the original source text by a filtering process that retains only the parts of the text relevant to a specific theme. For example, if the original source text consists of a collection of medical documents, a search procedure can be applied to identify and retrieve only the documents containing the word "cancer." The retrieved documents are taken as the theme-restricted collection for deriving the concept sequences.

Another option for deriving concept sequences with text would be to process the original source text to keep only words that are somewhat infrequent as indicated by an occurrence threshold, and that are in close proximity to a concept. In the example "Photonics" page listed above, this approach would lead to the following first paragraph: "invention laser 01 1960. developments laser diode 01 1970s, optical fibers 01 transmitting information erbium-doped fiber amplifier 01 telecommunications revolution infrastructure Internet 01."

Another option for deriving concept sequences is to construct sequences of concepts and words in units and (potentially rearranged) orderings, as determined by a natural language parser.

Another option for deriving concept sequences with text would be to explicitly specify a collection of words or types of words to be retained in the concept sequence. For example, one may have a specified collection of words connected to medicine (e.g., nurse, doctor, ward and operation), and the derived concept sequence would limit retained non-concept words or text to this specified collection.

To provide a second illustrative example of the concept sequence identifier process, the concept sequence identifier 12 may be configured to derive concept sequences (e.g., 12A) from one or more concept graphs 18 having nodes which represent concepts (e.g., Wikipedia concepts). As will be appreciated, a graph 18 may be constructed by any desired method (e.g., Google, etc.) to define "concept" nodes which may be tagged with weights indicating their relative importance. In addition, an edge of the graph is labeled with the strength of the connection between the concept nodes it connects. When edge weights are given, they indicate the strength or closeness of these concepts, or observed and recorded visits by users in temporal proximity. An example way of relating the edge weights to user visits is to define the edge weight connecting concept "A" to concept "B" to be the number of times users examined concept "A" and, within a short time window, examined concept "B".

Using the Wikipedia example, if a Wikipedia page "A" has a link to another Wikipedia page "B," then the graph 18 would include an edge connecting the "A" concept to the "B" concept. The weight of a node (importance) or the weight (strength) of an edge of an edge may be derived using any desired technique, such as a personalized Pagerank of the graph or other techniques. In addition, each concept i in the graph 18 may be associated with a (high dimensional) P-vector such that the $j^{th}$ entry of the P-vector corresponding to concept i is the strength of the connection between concept i and concept j. The entries of the P-vector may be used to assign weights to graph edges. To derive concept sequences from the concept graph(s) 18, the concept sequence identifier 12 may be configured to perform random walks on the concept graph(s) 18 and view these walks as concept sequences. For example, starting with a randomly chosen starting node v, the concept sequence identifier 12 examines the G-neighbors of v and the weights on the edges connecting v and its neighboring nodes. Based on the available weights (if none are available, the weights are considered to be equal), the next node is randomly chosen to identify the next node (concept) in the sequence where the probability to proceed to a node depends on the edge weight and the neighboring node's weight relative to other edges and neighboring nodes. This random walk process may be continued until a concept sequence of length H is obtained, where H may be a specified parametric value (e.g., 10,000). Then, the random walk process may be repeated with a new randomly selected starting point. If desired, the probability of selecting a node as a starting node may be proportional to its weight (when available). The result of a plurality of random walks on the graph 18 is a collection of length H sequences of concepts 12A.

Extracting sequences from the concept graph(s) 18 may also be done by using a random walk process in which each step has a specified probability that the sequence jumps back to the starting concept node (a.k.a., "teleportation"), thereby mimicking typical navigation behavior. Alternatively, a random walk process may be used in which each step has a specified probability that the sequence jumps back to the previous concept node, thereby mimicking other typical navigation behavior. If desired, a combination of the foregoing step sequences may be used to derive a concept sequence. Alternatively, a concept sequence may be derived by using a specified user behavior model M that determines the next concept to explore. Such a model M may employ a more elaborate scheme in order to determine to which concept a user will examine next, based on when previous concepts were examined and for what duration.

The resulting concept sequences 12A may be stored in the knowledge database 109 or directly accessed by the concept vector extractor 13. In addition, whenever changes are made to a concept graph 18, the foregoing process may be repeated to dynamically maintain concept sequences by adding new concept sequences 12A and/or removing obsolete ones. By revisiting the changed concept graph 18, previously identified concept sequences can be replaced with new concept sequences that would have been used, thereby providing a controlled time travel effect.

In addition to extracting concepts from annotated text 17 and/or graph representations 18, concept sequences 12A may be derived using graph-based vector techniques whereby an identified concept sequence 12A also includes a vector representation of the concept in the context of graph G (e.g., Pagerank-derived vectors). This added information about the concepts in the sequence 12A can be used to expedite and qualitatively improve the learning of parameters process, and learning quality, by providing grouping, i.e., additional information about concepts and their vicinity as embedded in these G-associated vectors.

To provide a third illustrative example of the concept sequence identifier process, the concept sequence identifier 12 may be configured to derive concept sequences (e.g., 12A) from the user navigation behavior 19 where selected pages visited by a user (or group of users) represent concepts. For example, the sequences of concepts may be the Wikipedia set of entries explored in succession by (a) a particular user, or (b) a collection of users. The definition of succession may allow non-Wikipedia intervening web exploration either limited by duration T (before resuming Wikipedia), number of intervening non-Wikipedia explorations, or a combination of theses or related criteria. As will be appreciated, user navigation behavior 19 may be captured and recorded using any desired method for tracking a sequence of web pages a user visits to capture or retain the "concepts" corresponding to each visited page and to ignore or disregard the pages that do not correspond to concepts. Each concept sequence 12A derived from the captured navigation behavior 19 may correspond to a particular user, and may be concatenated or combined with other user's concept sequences to obtain a long concept sequence for use with concept vector training. In other embodiments, the navigation behavior of a collection of users may be tracked to temporally record a concept sequence from all users. While such collective tracking blurs the distinction between individual users, this provides a mechanism for exposing a group effort. For example, if the group is a limited-size departmental unit (say, up to 20), the resulting group sequence 12A can reveal interesting relationships between the concepts captured from the user navigation behavior 19.

The underlying assumption is that the group of users is working on an interrelated set of topics.

To provide another illustrative example of the concept sequence identifier process, the concept sequence identifier 12 may be configured to generate concept sequences using concept annotations created by two or more different annotators, where each annotator uses its chosen set of names to refer to the collection of concepts included in a text source. For example, one annotator applied to a text source may mark up all occurrences of the concept of "The United State of America" as "U.S.A.", whereas another may mark it up as "The United States". In operation, a first concept sequence may be generated by extracting a first plurality of concepts from a first set of concept annotations for the one or more content sources, and a second concept sequence may be generated by extracting a second plurality of concepts from a second set of concept annotations for the one or more content sources. In this way, the concept sequence identifier 12 may be used to bring together different annotated versions of a corpus. In another example, a first set of concept annotations may be a large collection of medical papers that are marked up with concepts that are represented in the Unified Medical Language System (UMLS) Metathesaurus. The second set of concept annotations may be the same collection of medical papers that are marked up with concepts that are defined in the English Wikipedia. Since these two dictionaries have good overlap but they are not identical, they may refer to the same thing (e.g., leukemia) differently in the different sets of concept annotations.

In addition to identifying concept sequences 12A from one or more external sources 17-19, general concept sequences may be constructed out of extracted concept sequences. For example, previously captured concept sequences 109 may include a plurality of concept sequences S1, S2, . . . , Sm which originate from various sources. Using these concept sequences, the concept sequence identifier 12 may be configured to form a long sequence S by concatenating the sequences S=S1S2 . . . Sm.

Once concept sequences 12A are available (or stored 109), a concept vector extractor 13 may be configured to extract concept vectors 13A based on the collected concept sequences. For example, the concept vector extractor 13 may employ a vector embedding system (e.g., Neural-Network-based, matrix-based, log-linear classifier-based or the like) to compute a distributed representation (vectors) of concepts 13A from the statistics of associations embedded within the concept sequences 12A. More generally, the concept vector extractor 13 embodies a machine learning component which may use Natural Language Processing or other techniques to receive concept sequences as input. These sequences may be scanned repeatedly to generate a vector representation for each concept in the sequence by using a method, such as word2vec. Alternatively, a matrix may be derived from these sequences and a function is optimized over this matrix and word vectors, and possibly context vectors, resulting in a vector representation for each concept in the sequence. Other vector generating methods, such as using Neural Networks presented by a sequence of examples derived from the sequences, are possible. The resulting concept vector may be a low dimension (about 100-300) representation for the concept which can be used to compute the semantic and/or grammatical closeness of concepts, to test for analogies (e.g., "a king to a man is like a queen to what?") and to serve as features in classifiers or other predictive models. The resulting concept vectors 13A may be stored in the knowledge database 110 or directly accessed by one or more vector processing applications 14.

To generate concept vectors 13A, the concept vector extractor 13 may process semantic information or statistical properties deduced from word vectors extracted from the one or more external sources 17-19. To this end, the captured concept sequences 12A may be directed to the concept vector extraction function or module 13 which may use Natural Language Processing (NLP) or machine learning processes to analyze the concept sequences 12A to construct one or more concept vectors 13A, where "NLP" refers to the field of computer science, artificial intelligence, and linguistics concerned with the interactions between computers and human (natural) languages. In this context, NLP is related to the area of human-to-computer interaction and natural language understanding by computer systems that enable computer systems to derive meaning from human or natural language input. To process the concept sequences 12A, the concept vector extractor 13 may include a learning or optimization component which receives concept sequence examples 12A as Neural Network examples, via scanning text, and the like. In the learning component, parameters (Neural Network weights, matrix entries, coefficients in support vector machines (SVMs), etc.) are adjusted to optimize a desired goal, usually reducing an error or other specified quantity. For example, the learning task in the concept vector extractor 13 may be configured to implement a scanning method where learning takes place by presenting examples from a very large corpus of Natural Language (NL) sentences. The examples may be presented as Neural Network examples, in which the text is transformed into a sequence of examples where each example is encoded in a way convenient for the Neural Network intake, or via scanning text where a window of text is handled as a word sequence with no further encoding. In scanning methods, the learning task is usually to predict the next concept in a sequence, the middle concept in a sequence, concepts in the context looked at as a "bag of words," or other similar tasks. The learning task in the concept vector extractor 13 may be also configured to implement a matrix method wherein text characteristics are extracted into a matrix form and an optimization method is utilized to minimize a function expressing desired word vector representation. The learning results in a matrix (weights, parameters) from which one can extract concept vectors, or directly in concept vectors (one, or two per concept), where each vector Vi is associated with a corresponding concept Ci. Once the learning task is complete, the produced concept vectors may have other usages such as measuring "closeness" of concepts (usually in terms of cosine distance) or solving analogy problems of the form "a to b is like c to what?"

To provide a first illustrative example for computing concept vectors from concept sequences, the concept vector extractor 13 may be configured to employ vector embedding techniques (e.g., word2vec or other matrix factorization and dimensionality reduction techniques, such as NN, matrix-based, log-linear classifier or the like) whereby "windows" of k (e.g., 5-10) consecutive concepts are presented and one is "taken out" as the concept to be predicted. The result is a vector representation for each concept. Alternatively, the concept vector extractor 13 may be configured to use a concept to predict its neighboring concepts, and the training result produces the vectors. As will be appreciated, other vector producing methods may be used. Another interesting learning task by which vectors may be created is that of predicting the next few concepts or the previous few concepts (one sided windows).

To provide another illustrative example for computing concept vectors 13A from concept sequences 12A, the concept vector extractor 13 may be configured to employ NLP processing techniques to extract a distributed representation of NLP words and obtain vectors for the concept identifiers. As will be appreciated, the size of the window may be larger than those used in the NLP applications so as to allow for concepts to appear together in the window. In addition, a filter F which can be applied to retain non-concept words effectively restricts the words to only the ones that have a strong affinity to their nearby concepts as measured (for example, by their cosine distance to the concept viewed as a phrase in an NLP word vector production, e.g., by using word2vec).

To provide another illustrative example for computing concept vectors 13A from concept sequences 12A, the concept vector extractor 13 may be configured to employ NLP processing techniques to generate different concept vectors from different concept sequences by supplying a first plurality of concepts (extracted from a first set of concept annotations) as input to the vector learning component to generate the first concept vector and by supplying a second plurality of concepts (extracted from a second set of concept annotations) as input to the vector learning component to generate a second concept vector. If both versions of concept sequence annotations are brought together to obtain first and second concept vectors, the resulting vectors generated from the different concept sequence annotations can be compared to one another by computing similarities therebetween. As will be appreciated, different annotators do not always mark up the same text spans in exactly the same way, and when different annotation algorithms choose to mark up different occurrences of the term, a direct comparison of the resulting concept vectors just by text alignment techniques is not trivial. However, if both versions of annotated text sources are included in the embedding process, by way of association with other concepts and non-concept words, the respective concept vectors can be brought to close proximity in the embedding space. Computing similarities between the vectors could reveal the linkage between such alternative annotations.

Once concept vectors 13A are available (or stored 110), they can be manipulated in order to answer questions such as "a king is to man is like a queen is to what?", cluster similar words based on a similarity measure (e.g., cosine distance), or use these vectors in other analytical models such as a classification/regression model for making various predictions. For example, one or more vector processing applications 14 may be applied to carry out useful tasks in the domain of concepts and user-concept interaction, allowing better presentation and visualization of concepts and their inter-relations (e.g., hierarchical presentation, grouping, and for a richer and more efficient user navigation over the concept graph). For example, an application 14 may access n vectors $V1, \ldots, Vn$ of dimension d which represent n corresponding concepts $C1, \ldots, Cn$, where a vector $Vi$ is a tuple $(vi1, \ldots, vid)$ of entries where each entry is a real number. Concept vector processing may include using a similarity calculation engine 15 to calculate a similarity metric value between (1) one or more concepts (or nodes) in an extracted concept sequence (e.g., 109) and/or (2) one or more extracted concept vectors (e.g., 110). Such concept/vector processing at the similarity calculation engine 15 may include the computation of the dot product of two vectors $Vh$ and $Vi$, denoted $dot(Vh, Vi)$ is $\Sigma j=1, \ldots, d\ Vhj*Vij$. In concept vectors processing, the length of vector $Vi$ is defined as the square root of $dot(Vi, Vi)$, i.e., $SQRT(dot(Vi, Vi))$. In addition, concept vector processing at the similarity calculation engine 15 may include computation of the cosine distance between $Vh$ and $Vi$, denoted $cos(Vh, Vi)$, is $dot(Vh, Vi)/(length(Vh)*length(Vi))$. The cosine distance is a measure of similarity, where a value of "1" indicates very high similarity and a value of "−1" indicates very weak similarity. As will be appreciated, there are other measures of similarity that may be used to process concept vectors, such as soft cosine similarity. In addition, it will be appreciated that the concept vector processing may employ the similarity calculation engine 15 as part of the process for extracting concept sequences 12, as part of the process of concept vector extraction 13, or as concept vector processing step for constructing a concept hierarchy.

To provide a first illustrative example application for processing concept vectors 13A, a vector processing application 14 may be configured to build a hierarchy of concepts to help a user study the area, this is especially so if the hierarchy edges are tagged, e.g. "application_of_theory." For example, after a user explores a plurality of concepts (e.g., Wikipedia concepts), the user may request the user's browser to produce a hierarchy of concepts involving the recently visited concepts or pages. In response, the vector processing application 14 may process the extracted concept vectors 13A to detect analogies with a sufficiently high probability to thereby infer hierarchical representations of concepts. For example, with a concept hierarchy, concepts that relate to "Optics" can be detected in a way similar to the way Optics relates to Physics. A concept that scores high (e.g. "Non-linear Optics") will be a sub-concept of Optics. Some concepts may be part of more than one hierarchy and we can limit their participation or require a sufficiently strong relationship (which can be a system parameter), or derive hierarchies corresponding to different facets. To build a hierarchy, the vector processing application 14 may prompt the user to indicate the number of concepts (e.g., k) to be embedded in a hierarchy. Alternatively, a default k value (e.g., k=5) may be set. The vector processing application 14 may also display to the user a list of recently explored concepts, allowing the user to identify (e.g., by clicking) the concepts of interest. Once the user identifies a sequence $S=C1, \ldots, Ck$ of the k relevant concepts and the corresponding vectors $V'1, \ldots, V'k$ are extracted, the vector processing application 14 may compute the cosine distance, $cos(Ci, Cj)=cos(V'i, V'j)$ between any pair of distinct concepts $Ci$ and $Cj$ in S. Then, the vector processing application 14 can compute hierarchies using a bottom-up method, top-down/frequency method, or analogy method.

In the bottom-up method, the vector processing application 14 forms an undirected graph G which is initially empty, and also identifies the set of concepts in the sequence, say set $S1=\{C1, \ldots, Ck\}$. While there exists a pair of distinct concepts $Ci, Cj$ in $S1$ such that $cos(Ci, Cj)$ is the highest among all distinct pairs such that there is no path connecting $Ci$ and $Cj$ in G, the vector processing application 14 adds the nodes $Ci$ and/or $Cj$ to G if not already included, and also adds an edge $(Ci, Cj)$ to G, where the edge is labeled with $cos(Ci, Cj)$. In addition, the vector processing application 14 identifies the "root" of the hierarchy as being the concept that has the maximum number of occurrences in the concept sequence on which the learning was performed. In selected embodiments, the user may designate a different "root."

In the top-down/frequency method, the vector processing application 14 first sorts the concept sequence $S1=(C1, \ldots, Ck)$ such that the number of concept occurrences of $Ci$ is bigger than or equal to the number of occurrences of $Ci+1$, $i=1, \ldots, k-1$. The vector processing application 14 then initializes a hierarchy H (e.g., directed rooted tree) to be empty. Using the sorted concept sequence $S1$, the vector processing application 14 then adds the first concept C1 as a root node of H (C1 has the most occurrences), and repeats the concept addition step until all concepts have been added as nodes to H. In the addition step, the vector processing application 14 may identify a concept C' that is not yet in H such that its cosine distance to some concept C" in H is maximal, and then add the concept C' to H as a child of concept C". A tie is broken in favor of a concept appearing first in the sequence S1. As a result, a hierarchy H is constructed out of all concepts C1, . . . , Ck.

In both the bottom-up and top-down/frequency methods, the vector representations of just C1, . . . , Ck can be learned by first restricting the sequence of concepts to C1, . . . , Ck (by deleting the others) and then learning the vector representation. A variation may be restricting to C1, . . . , Ck and concepts that are highly related to them, i.e., those whose cosine distance to some concept C in C1, . . . , Ck is among the U (a parameter, e.g. 3) highest cosine distances to these concepts.

In the analogy method, the vector processing application 14 may be configured to construct a sequence of concepts that encodes a hypothetical hierarchy. The way to proceed is to first assume a desirable hierarchical structure with a chosen branching factor and a chosen depth. Label the nodes in this structure as abstract concepts C1, . . . , Ck. Then, one can construct a sequence of these abstract concepts by simulating a random walk on this structure according to a set of probabilistic rules. Afterwards, one can take this sequence together with a corpus-induced sequence of regular concepts D1, . . . , Dk, and use an embedding method to compute vectors of both the abstract and regular concepts. By exploiting analogies of relationships between the abstract concepts and those between the regular concepts, one can find pairs of regular concepts that best approximate the pairs of abstract concepts with a specific (e.g., parent-child, sibling) relationship in the hypothetical structure. An example is as follows. For explanation purposes, the hierarchy is assumed to have a branching factor of 3 and a depth of 4 (other numbers are possible). The sequence of concepts is constructed by performing a walk over the hierarchy, starting at its root. The hypothetical hierarchy is constructed so that, at root, one can proceed to each child with probability ⅓; at each step at an internal hierarchy node, one can proceed to each child of the current concept with probability ¼, can return back to the immediate parent with a probability ⅛, and can return back to the hierarchy root with a probability ⅛. In addition, each leaf of the hypothetical hierarchy is constructed so that one can return from the leaf back to the immediate parent with a probability ⅞, and can return back to the root with a probability ⅛. For certain domains, the values (e.g., ⅓, ¼, ⅛, ⅞, etc.) may be changed to other values better fit for that domain, and this can be done interactively with the user or by pre-setting these parameters to other values. Learning from the resulting sequence of concepts and the original concept sequence (e.g., by simple concatenation), a concept vector may be obtained and processed by the vector processing application 14 which is configured to "match" each of the concepts D1, . . . , Dk to nodes in the hypothetical hierarchy C1, . . . , Ck. This may be accomplished by carrying out a sequence of concept analogy queries of the form "Ca to Cb is like Di to what?" where Ca and Cb are hypothetical hierarchy concepts, and where Di, Di' are regular concepts, Ca is an immediate parent of Cb in the hierarchy, and where D'i is identified as the answer to the analogy query. An analogy query is expressed as "Find Di' in C1, . . . , Ck such that Xi=cos (Di−Ca+Cb, D'i) is maximal." The vector processing application 14 may then build a graph G with D1, . . . , Dk as nodes, and then add an edge from Di to D'i labeled with Xi. If there is already an edge from Di to Di' labeled Y, Y may be replaced by max(Y, Xi). If there is already an edge from Di' to Di labeled Y, then the vector processing application 14 may compare Xi and Y and eliminate the edge labeled with the smaller value. At the end of the sequence of all possible queries, the vector processing application 14 generates a directed edge-labeled graph. Ignoring the direction of the edges, a maximum spanning tree T may be constructed over the graph before re-introducing the edge directions. If the spanning tree displays a hierarchy, the process is complete. Otherwise, the vector processing application 14 finds the least number of edges whose reversal turns the tree into a hierarchy, and displays the tree resulting from the reversal, with reversed edges clearly indicated ("suspect"). The analogy method may be tried on a number of hypothetical hierarchies generated with different parameters so that a number of hierarchies connecting the k concepts are constructed and presented to the user in order of the least number of applied edge reversals.

In selected embodiments of the present disclosure, similarity-based concept hierarchy generation schemes may be modified to follow similarities in restricted or specified dimensions of the concept vectors by manipulating the concept similarity metric to promote synonyms/hypernyms of a specified topic. An example of such a manipulation is to define a metric that masks off the irrelevant dimensions of a concept vector and/or to up-weight any concept vector dimensions that are of particular interest in each application. Without loss of generality, one may assume that each dimension of the concept vectors represents a certain range of meaning. If the meanings of the dimensions are not immediately explicit, the vectors can be rotated or projected into more interpretable dimensions using one of several known methods such as, for example, principal component analysis, or by computing the similarity between a vector and a pre-selected set of anchor vectors. In the latter case, a concept vector is converted to a vector of similarities to the chosen anchors.

When computing the similarity measures in one of the methods described above, a nonspecific cosine distance computation (employing all dimensions) may be replaced with a restricted metric that employs only the chosen dimensions, resulting in a concept hierarchy that is made specific to the semantics represented by included dimensions of the original or modified concept vectors. One may also choose to manipulate the metric to specialize to different semantic aspects at different levels of the hierarchy. For example, a hierarchy about countries may be constructed in a top-down fashion with the first split on dimensions relevant to geography, and then a second split on dimensions relevant to socio-economic conditions, etc. At each split, a set of not-yet-selected concepts that are most similar to the previously selected concepts in the relevant dimensions are chosen as children of the nodes representing the previously selected concepts. Another example is that one may build a hierarchy of countries with all levels split on different resolutions along a chosen socio-economic dimension.

To provide another illustrative example application for processing concept vectors 13A to compute concept hierarchies, a vector processing application 14 may be configured to build or discover a hierarchy of concept neighborhoods using agglomerative hierarchical clustering methods for vectors that is based on a chosen similarity metric such as the cosine distance, and one or more of the standard linkage criteria for merging candidate clusters, such as complete linkage, average linkage, or single linkage. Furthermore, during the bottom-up construction of the hierarchy, the application may switch among alternative linkage criteria according to the size, shape, and a measure of validity of the intermediate clusters. For example, the complete linkage criteria may be used when the number of elements is small, and/or when the covariance is close to isotropic in each of two candidate clusters to be merged. One may switch to the average linkage criterion or the single linkage criterion for larger candidate clusters with less symmetric structure. A representative of each intermediate cluster may be chosen to be the concept vector that has the maximum mean similarity to all other members of the cluster.

To provide another illustrative example application for processing concept vectors 13A to compute concept hierarchies, a vector processing application 14 may be configured to build or discover a hierarchy of concept neighborhoods using iterative clustering and probability flow-based traversals. For example, after a user explores one or more concept graphs 18 having nodes which represent concepts (e.g., Wikipedia concepts), the user may request the user's browser to produce a hierarchy of concept neighborhoods, where each neighborhood can be understood by the user as a topic or common theme between the concepts that are measured to be connected to the neighborhood. In response to the neighborhood hierarchy request, the vector processing application 14 may process the extracted concept vectors 13A to identify, for each concept (node in the graph), the neighborhood of the graph that is associated with the concept along with a computed strength or similarity metric. In addition, the vector processing application 14 may process the concepts belonging to each neighborhood to identify a single concept that can represent the neighborhood. The construction of neighborhood hierarchies can be done by iteratively selecting nodes from a starting concept graph G for processing to identify the most similar non-selected node in concept graph G for combination with each selected node, for removal from concept graph G, and for transfer to a graph $N\_i$, and edges from the two combined nodes are transferred to $N\_i$ to point to appropriate representative nodes of $N\_i$, until all nodes are removed from concept graph G, at which point the graph $N\_i$ is stored, the concept graph G is updated with the graph $N\_i$, and the process is repeated for i=i+1 until the number of nodes in the graph $N\_i$ is less than a specified number of neighborhoods. For any graph $N\_i$ resultant from the iterations node similarity may be computed using a standard node similarity metric, such as SimRank and Jaccard similarity coefficients, on the nodes created by the joining of the two nodes in graph $N\_(i-1)$. The vector processing application 14 may also create a hierarchy of neighborhoods for display, allowing the user to efficiently identify how a collection of concepts relate to each other, and whether the collection can be partitioned into specific themes that are low in the hierarchy. To provide an illustrative example of usage for the proposed hierarchical clustering and mapping, the corpus may include a first document (A) containing concepts regarding "web design" and "web accessibility." Given a second document (B) which contains concepts regarding "javascript" and "HTML," a neighborhood hierarchy discovery algorithm can efficiently classify that concepts in the documents A and B are under a "web development" theme. Now, given a third document (C) which refers to the concept of "visual impairment," the neighborhood hierarchy discovery algorithm would be configured to efficiently identify that the theme in common between A and C is "web accessibility." Identifying whether to classify A, B, and C into a single, higher-level theme, or whether to classify A, B, and C into multiple categories can be done by traversing the $N\_i$ graphs generated from the multiple iterations of the algorithm, and determining in which $N\_i$ graphs do the A, B and C nodes appear in the same supernode (neighborhood). Due to the logarithmic decrease in nodes after each iteration of the algorithm, graphs generated through fewer iterations starting from G are composed of more nodes (more neighborhoods) than graphs generated from more iterations. If nodes A, B and C are found to be in the same neighborhood in a low iteration $N\_i$, they are considered to be highly connected, whereas if A, B, and C are only found in the same neighborhood in a high iteration $N\_i$, they are considered to be lowly connected.

To facilitate interaction with the neighborhood hierarchy, each neighborhood may be assigned a label selected from one of the nodes in the neighborhood in order to make the neighborhood (topic) more easily identified by a user. To this end, the vector processing application 14 may sort the nodes of the concept graph G that are contained in each neighborhood node in $N\_i$ by popularity in G using any desired sorting algorithm. For example, the popularity of nodes can be computed using PageRank algorithm in G. The node with the highest page rank value is then selected as representative label for the neighborhood.

In other embodiments, the vector processing application 14 may be configured to associate each concept in the graph G to different neighborhoods in $N\_i$. To this end, the vector processing application 14 may be configured to process each node in G using a probability flow traversal algorithm (such as personalized page rank) to score the probability of traversal from each node G, to the selected representative node that formed the neighborhood in $N\_i$. The proximity of the node in G to the neighborhood identified in $N\_i$ is said to be the probability of traversal to the representative node in G. With this construct, each node in G can be represented with a vector of cardinality size-of-$N\_i$, with each entry of the vector specifying the corresponding probability of the node traversing to the representative in $N\_i$. Vectors can be generated for each of the $N\_0, N\_1, \ldots, N\_i$ neighborhood graphs for subsequent hierarchical comparisons.

An example use of such neighborhood graph vectors is to perform vector (concept) clustering to determine common neighborhoods between collections of concepts. To this end, the vector processing application 14 may use standard clustering algorithms to cluster the vectorial representation of concepts in the $N\_i$ hierarchies. The search space can be traversed iteratively, starting from $N\_0$, until all or most vectors are classified into a target number of clusters.

As disclosed herein, there are a variety of vector processing applications (such as link addition prediction, navigation prediction, ontology construction and more) where concept vectors are processed to generate hierarchies for concepts. In addition, it is possible to construct multiple hierarchies where some concepts may belong to multiple hierarchies. To address challenges with visually presenting such concept hierarchies, the vector processing application 14 may be configured to display a single hierarchy, multiple hierarchies, and nodes therein to serve as a visual aid for a user trying to comprehend the interrelationships between concepts in a specific area.

When displaying a single hierarchy as a simple tree, the vector processing application 14 may be configured to display a tree that is too large for display on a screen by displaying the tree in parts, or the tree may be abstracted by displaying only some parts. In case of displaying multiple hierarchies, the vector processing application 14 may be configured to display each tree in a distinct color. In addition, nodes belonging to multiple hierarchies are multi-colored accordingly. To avoid clutter, only portions of the hierarchies may be presented or abstracted.

When selecting multiple hierarchies for presentation and display next to each other, an important neighbor selection criterion is that there is a strong interaction (high cosine distance) between the roots of the hierarchies. To achieve this, the vector processing application 14 may include a multi-stage display algorithm or module. In the first stage, the display algorithm locates or identifies the two hierarchies H1 and H2 whose roots have the strongest interaction and places them next to each other. Suppose the arrangement is H1H2, in which case the outer pair is H1 and H2. In the second stage, the display algorithm locates or identifies the two hierarchies that have the strongest interaction with H1 and H2. In this example, H3 has the strongest interaction with H2, and H4 has the strongest interaction with H1. The identified hierarchies may then be arranged on the display as H4H1H2H3, with H4 and H3 being the outer pair. Stated more generally, an outer pair Hx and Hy are identified by first locating a new hierarchy with the strongest interaction with Hx and placing it accordingly. In case of a tie between two new hierarchies (e.g., Ha and Hb have the same cosine distance to Hx), the hierarchy (e.g., Ha) which has more concepts that also occur in Hx is chosen. If there is still a tie, then the election may be resolved arbitrarily (e.g., choose the one with the lower index). In similar fashion, a new hierarchy with the strongest interaction with Hy is located and placed accordingly next to Hy.

When presenting and displaying nodes in multiple hierarchies, the relationship between nodes can be visually displayed by configuring the vector processing application 14 to include a presentation component which displays the nodes in the colors of their hierarchies. Optionally, such nodes may be displayed as pulsing nodes and/or may be connected via lines which are bi-colored by the colors of the connected hierarchies. In other embodiments, the presentation component in the vector processing application 14 may be configured to respond to the placement of a mouse or cursor over a node by displaying the colors and perhaps root concepts of other hierarchies containing this node, thereby enabling a "jump" to the node's other occurrence(s) within such a hierarchy.

Types of information handling systems that can use the QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include a pen or tablet computer 120, laptop or notebook computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems.

Figure 2:
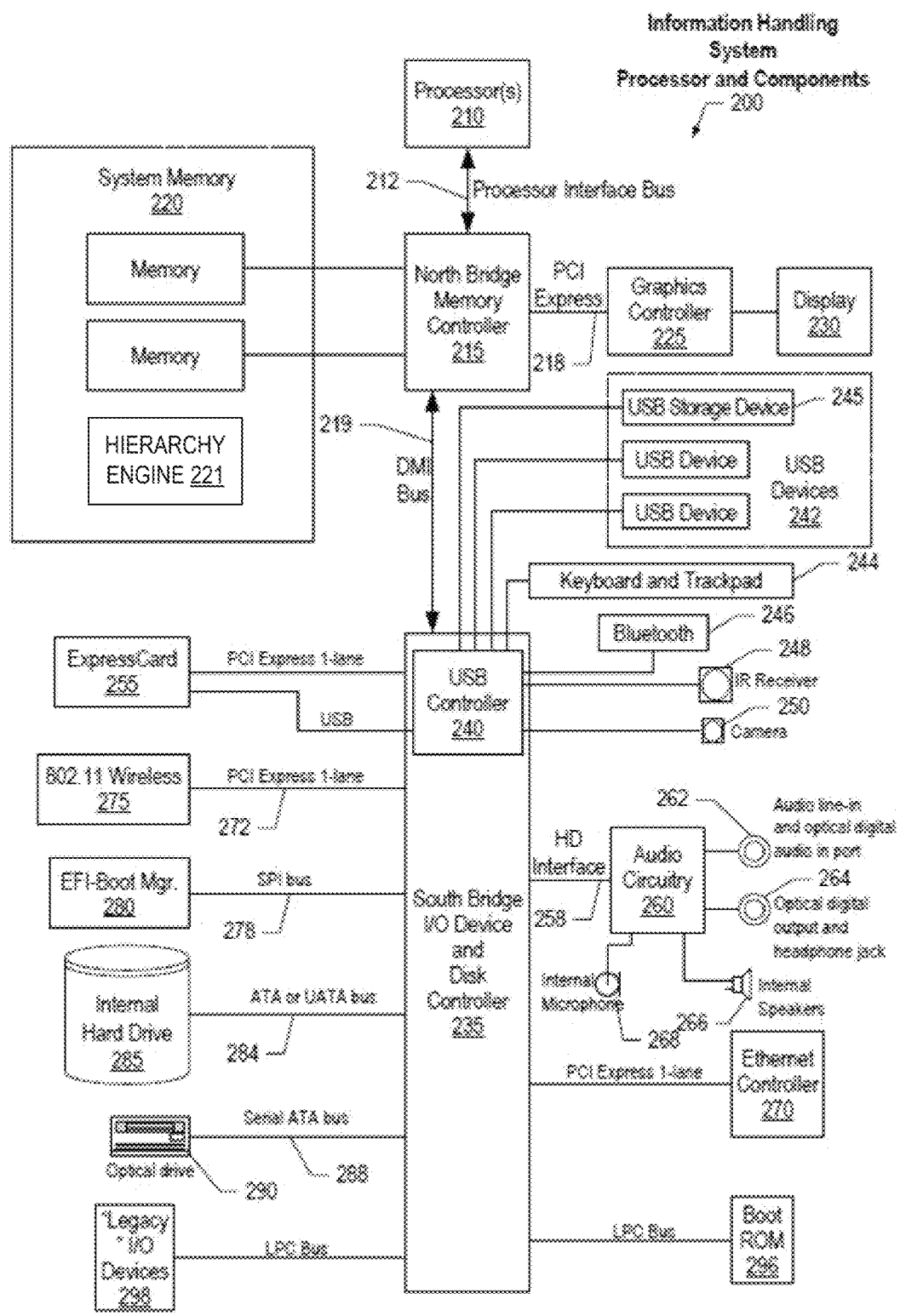
FIG. 2 is a block diagram of a processor and components of an information handling system such as those shown in FIG. 1.

FIG. 2 illustrates an illustrative example of an information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a hierarchy engine module 221 which may be invoked to extract concept vectors from user interactions and data sources and to construct concept and/or neighborhood hierarchies based on the generation and manipulation of similarity metrics to promote user understanding of an area. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) and the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one example configuration for an information handling system 200, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
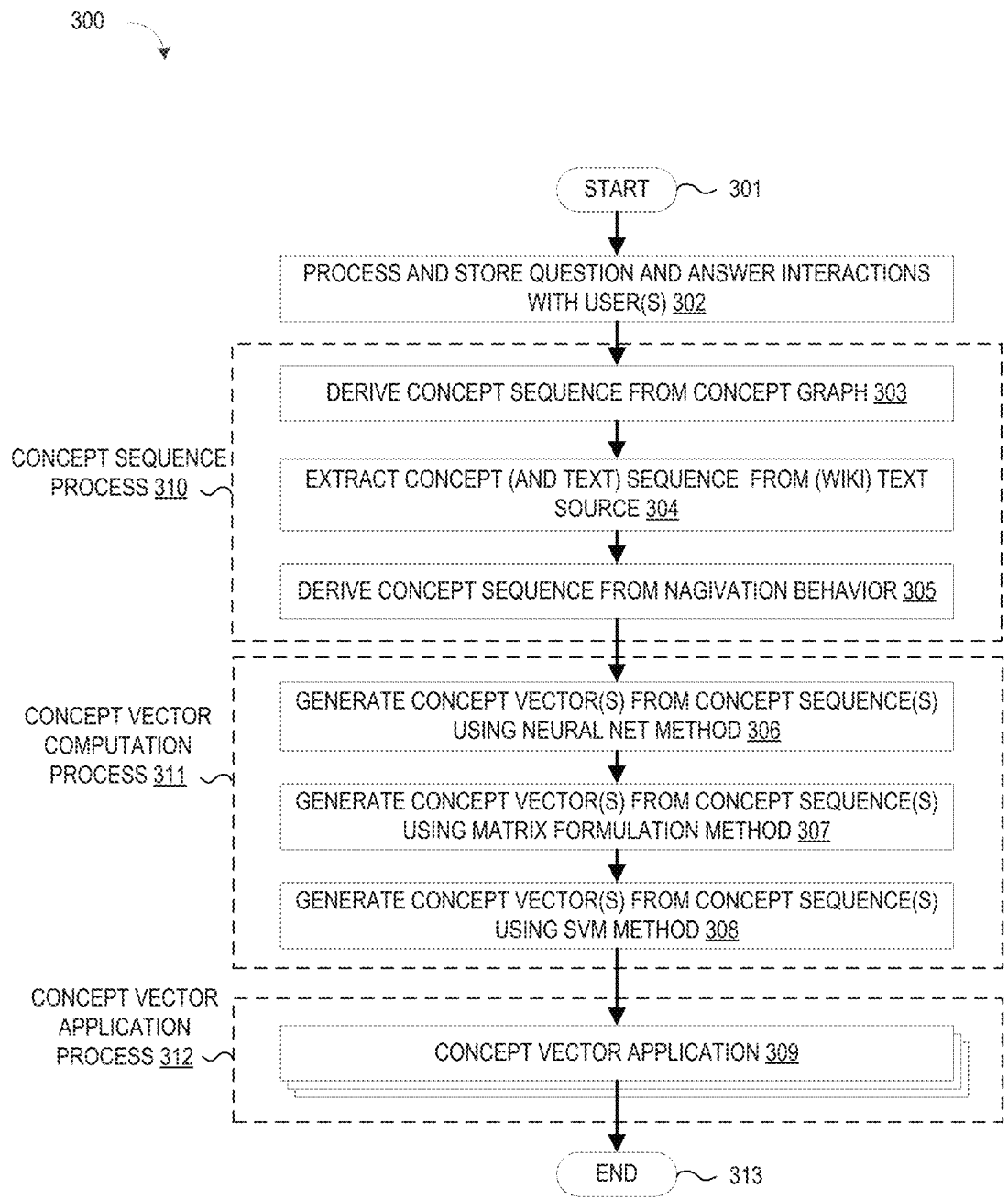
FIG. 3 illustrates a simplified flow chart showing the logic for obtaining and using a distributed representation of concepts as vectors.

To provide additional details for an improved understanding of selected embodiments of the present disclosure, reference is now made to FIG. 3 which depicts a simplified flow chart 300 showing the logic for obtaining and using a distributed representation of concepts as vectors. The processing shown in FIG. 3 may be performed in whole or in part by a cognitive system, such as the QA information handing system 15, QA system 100, or other natural language question answering system which identifies sequences of concepts to extract concept vectors (e.g., distributed representations of the concept) which may be processed to carry out useful tasks in the domain of concepts and user-concept interaction.

FIG. 3 processing commences at 301 whereupon, at step 302, a question or inquiry from one or more end users is processed to generate an answer with associated evidence and confidence measures for the end user(s), and the resulting question and answer interactions are stored in an interaction history database. The processing at step 302 may be performed at the QA system 100 or other NLP question answering system, though any desired information processing system for processing questions and answers may be used. As described herein, a Natural Language Processing (NLP) routine may be used to process the received questions and/or generate a computed answer with associated evidence and confidence measures. In this context, NLP is related to the area of human-computer interaction and natural language understanding by computer systems that enable computer systems to derive meaning from human or natural language input.

In the course of processing questions to generate answers, a collection or sequence of concepts may be processed at step 310. The concept sequence processing at step 310 may be performed at the QA system 100 or concept vector engine 13 by employing NLP processing and/or extraction algorithms, machine learning techniques, and/or manual processing to collect concepts from one or more external sources (such as the Wikipedia or some other restricted domain, one or more concept graph sources, and/or captured user navigation behavior) to generate training input comprising concept sequences. As will be appreciated, one or more processing steps may be employed to obtain the concept sequences.

For example, the concept sequence processing at step 310 may employ one or more concept graphs to generate concept sequences at step 303. To this end, the concept graph derivation step 303 may construct a graph G using any desired technique (e.g., a graph consisting of Wikipedia articles as nodes and the links between them as edges) to define concepts at each graph node which may be tagged with weights indicating its relative importance. In addition, the graph edges may be weighted to indicate concept proximity. By traversing the graph G using the indicated weights to affect the probability of navigating via an edge, a sequence of concepts may be constructed at step 303. In contrast to existing approaches for performing short random walks on graph nodes which view these as sentences and extract a vector representation for each node, the graph derivation step 303 may employ a random walk that is directed by the edge weights such that there is a higher probability to traverse heavier weight edges, thereby indicating closeness of concepts. In addition, the concept graphs employed by the graph derivation step 303 encodes many distinct domains may be represented as graphs that are derived non-trivially from the conventional web graph. In addition, the graph derivation step 303 may allow a graph traversal with a "one step back" that is not conventionally available. As a result, the resulting concept vectors are quite different.

In addition or in the alternative, the concept sequence processing at step 310 may employ one or more text sources to extract concept sequences at step 304. In selected embodiments, the text source is the Wikipedia set of entries or some other restricted domain. By analyzing a large corpus of documents mentioning Wikipedia entries (e.g., Wikipedia itself and other documents mentioning its entries), the text source extraction step 304 may extract the sequence of concepts, including the title, but ignoring all other text. In addition, the text source extraction step 304 may extract the sequence of appearing concepts along with additional words that are extracted with the concept in the context of surrounding its textual description while using a filter to remove other words not related to the extracted concepts. Alternatively, the text source extraction step 304 may extract a mixture of concepts and text by parsing a text source to identify concepts contained therein, replacing all concept occurrences with unique concept identifiers (e.g., by appending a suffix to each concept or associating critical words with concepts).

In addition or in the alternative, the concept sequence processing at step 310 may employ behavior tracking to derive concept sequences at step 305. In selected embodiments, the actual user's navigation behavior is tracked to use the actual sequence of explored concepts by a single user or a collection of users to derive the concept sequence at step 305. In selected embodiments, the tracking of user navigation behavior may allow non-Wikipedia intervening web exploration that is limited by duration T before resuming Wikipedia, by the number of intervening non-Wikipedia explorations, by elapsed time or a combination of these or related criteria.

After the concept sequence processing step 310, the collected concept sequences may be processed to compute concept vectors using known vector embedding methods at step 311. As disclosed herein, the concept vector computation processing at step 311 may be performed at the QA system 100 or concept vector extractor 12 by employing machine learning techniques and/or NLP techniques to compute a distributed representation (vectors) of concepts from the statistics of associations. As will be appreciated, one or more processing steps may be employed to compute the concept vectors. For example, the concept vector computation processing at step 311 may employ NL processing technique such as word2vec or to implement a neural network (NN) method at step 306 to perform "brute force" learning from training examples derived from concept sequences provided by step 310. In addition or in the alternative, the concept vector computation processing at step 311 may employ various matrix formulations at method step 307 and/or extended with SVM-based methods at step 308. In each case, the vector computation process may use a learning component in which selected parameters (e.g., NN weights, matrix entries, vector entries, etc.) are repeatedly adjusted until a desired level of learning is achieved.

After the concept vector computation processing step 311, the computed concept vectors may be used in various applications at step 312 which may be performed at the QA system 100 or the concept vector application module 14 by employing NLP processing, artificial intelligence, extraction algorithms, machine learning model processing, and/or manual processing to process the distributed representation (concept vectors) to carry out useful tasks in the domain of concepts and user-concept interaction. For example, a hierarchy building application 309 performed at step 312 may build a hierarchy using concept vectors to detect analogies and with a sufficiently high probability to construct a hierarchical representation of concepts. A constructed hierarchy can be used to verify another classification hierarchy (e.g., the ACM Computing Classification System (CCS) hierarchy) by constructing a hierarchy using the hierarchy building application 309 to automatically tag papers appropriately according to the CCS hierarchy and evaluate how closely the constructed hierarchy agrees with the distributed representation of the CCS hierarchy. In addition, the CCS hierarchy can be used to train the recognition of hierarchical relations. The hierarchy building application 309 may include a display or visualization component to efficiently display a collection of hierarchies in a plane or 3D space with color distinction between neighboring hierarchies. Concepts in common between different hierarchies will tend to cause closely drawing the respective hierarchies. As will be appreciated, each of the concept vector applications 309 executed at step 312 can be tailored or constrained to a specified domain by restricting the corpus input to only documents relevant to the domain and/or restricting concept sequences to the domain and/or restricting remaining words to those of significance to the domain.

Figure 4:
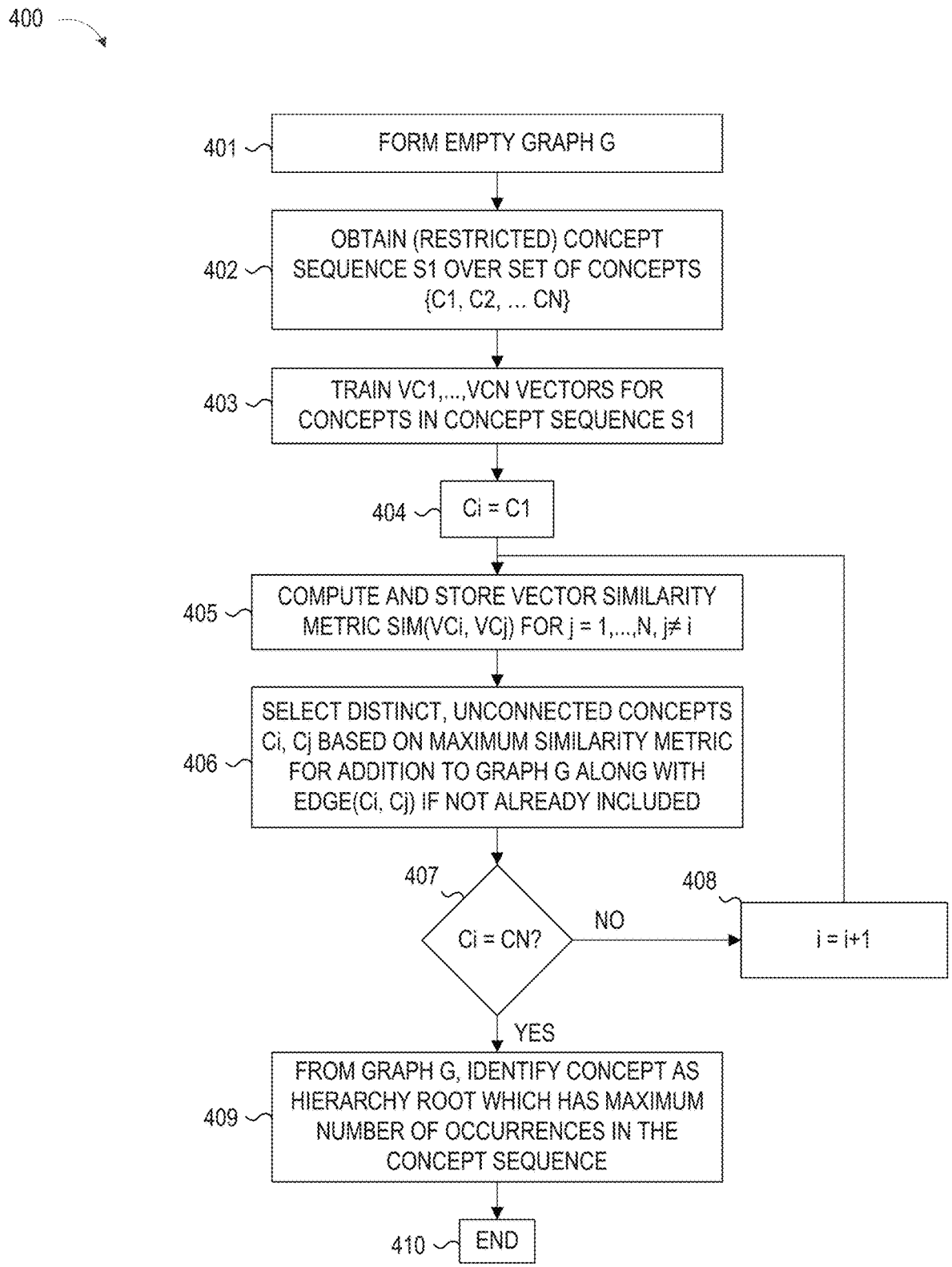
FIG. 4 illustrates a simplified flow chart showing the logic for generating a hierarchy of concepts using a bottom-up method.

To provide additional details for an improved understanding of selected embodiments of the present disclosure, reference is now made to FIG. 4 which depicts a simplified flow chart 400 showing the logic and method steps 401-410 for evaluating a set of concepts using distributed representations of these concepts as vectors by generating a hierarchy of concepts using a bottom-up method. The processing shown in FIG. 4 may be performed in whole or in part by a cognitive system, such as the QA information handing system 16, QA system 100, or other natural language question answering system which uses concept vectors to generate concept hierarchies.

FIG. 4 processing commences at step 401 by forming an undirected graph G which is initially empty. In selected embodiments, the empty graph G may be stored a database (e.g., 106) or may be generated by the QA information handing system 16.

At step 402, the process continues by capturing, retrieving, or otherwise obtaining at least one input set of concepts, such as a concept sequence S1 over set of concepts {C1, . . . , Cn}. In selected embodiments, the input concept sequence S1 may be retrieved from storage in a database, or may be generated by a concept sequence identifier (e.g., 12) that extracts a sequence of concepts from graph representations 18 of concepts and their inter-relations. In selected embodiments, the collected concept sequence can be restricted to set of concepts {C1, . . . , Ck} by deleting selected concepts (e.g., Ck+1, . . . , Cn). Alternatively, the concept sequence S1 can be restricted to selected concepts (e.g., C1, . . . , Ck) and concepts that are highly related to them, i.e., those whose cosine distance to some concept C in {C1, . . . , Ck} is among the U (a parameter, e.g. 3) highest cosine distances to these concepts.

At step 403, one or more concept vectors VC1, . . . , VCn, may be generated to serve as representations for C1, . . . , Cn, such as by using concept sequences obtained at step 402 to compute or train concept vectors VC1, . . . , VCn, for the concepts in the concept sequence S1 using any desired vector embedding techniques. As disclosed herein, the concept vector computation processing at step 403 may be performed at the QA system 100 or concept vector extractor 13 by employing machine learning techniques and/or NLP techniques to compute a distributed representation (vectors) of concepts VC1, . . . , VCn which are trained on the concepts from the input sequence S1. For example, the concept vector computation processing at step 403 may employ NL processing technique such as word2vec or to implement a neural network (NN) method to perform "brute force" learning from training examples derived from concept sequences that contain those concepts in S1. In addition or in the alternative, the concept vector computation processing at step 403 may employ various matrix formulations and/or extended with SVM-based methods. In each case, the vector computation process may use a learning component in which selected parameters (e.g., NN weights, matrix entries, vector entries, etc.) are repeatedly adjusted until a desired level of learning is achieved. Though illustrated as occurring after step 402, the vector extraction step 403 may be skipped in situations where the concept vectors were previously extracted or computed. In selected embodiments, a set of vector representations based on a selected concept subset C1, . . . , Ck can be learned by first restricting the sequence of concepts to C1, . . . , Ck (by deleting the others) and then learning the vector representation VC1, . . . , VCk.

Each concept Ci in the concept sequence S1 (or restricted concept sequence) is sequentially processed to find a nearest neighbor from the other concept vectors, starting with an initialization step 404 where a first concept C1 is selected. At step 405, the input concept sequence S1 is further processed to compute and store vector similarity metric values between each different concept in the input concept sequence. As disclosed herein, the computation of the vector similarity metric values at step 405 may be performed at the QA system 100 or vector processing application 14 by using the similarity calculation engine 15 to compute a similarity metric sim(VCi, VCj) for i,j=1, . . . , N, j≠i. In an example embodiment, the vector similarity metric values may be computed by configuring the QA system 100 or vector processing applications 14 to compute, for each concept Ci, the cosine similarity metric value cos(VCi, VCj) for i, j=1, . . . , N, j≠i.

Once the vector similarity measures of the selected concept Ci=C1 are computed and stored for all of the other concepts Cj (j=1, . . . , N, j≠i) in the set S1, the computed vector similarity metric values are used at step 406 to identify each pair of distinct, unconnected concepts Ci, Cj in the concept sequence S1 based on the maximum vector similarity measure. For example, assume that cos(Ci, Cj) is used as the vector similarity measure between Ci and Cj. While there exists a pair of distinct concepts Ci, Cj in S1 such that cos(Ci, Cj) is the highest among all distinct pairs such that there is no path connecting Ci and Cj in G, the vector processing application 14 adds the nodes Ci and/or Cj to the concept graph G, assuming the nodes are not already included. In addition, the vector processing application 14 adds a corresponding edge(Ci, Cj) to the concept graph G, where the edge is labeled with cos(Ci, Cj). As disclosed herein, the selection of the distinct, unconnected concept pairs Ci, Cj for transfer to the concept graph G at step 406 may be performed at the QA system 100 or vector processing application 14 by identifying the concept pairs Ci, Cj for which sim(VCi, VCj) has the maximum vector similarity metric value.

At step 407, it is determined if all of the candidate concepts Ci in the concept sequence S1 have been processed through steps 405-406 by detecting if the selected concept is the last concept in the set of concepts appearing in the concept sequence S1 (e.g., "Ci=Cn?"). If not (negative outcome to detection step 407), a count value i is incremented (step 408), and the steps 405-406 are iteratively repeated until the last concept in the concept sequence S1 is reached (affirmative outcome to detection step 407).

Once every candidate concept Ci appearing in the input concept sequence S1 has been processed to transfer the most similar distinct, unconnected concept pairs Ci, Cj to the graph G with corresponding edge values (e.g., edge(Ci, Cj)), the process continues at step 409 by processing the concept pairs collected in the concept graph G to identify the "root" of the hierarchy using any desired root identification process. As disclosed herein, the root selection processing may be performed at the QA system 100 or vector processing application 14 by identifying the concept in the concept graph G that has the maximum number of occurrences in the concept sequence S1 on which the learning was performed. In selected embodiments, the user may designate a different "root." At step 410, the process ends.

The described process of steps 401-410 uses vector similarity metric values sim(VCi, VCj) to evaluate the similarity of concept pairs Ci, Cj, such as by computing the cosine distance between vectors. However, it will be appreciated that the QA system 100 or vector processing applications 14 may use any desired similarity metric computation to compute a vector distance measure, such as the L_infinity norm (max norm), Euclidean distance, etc.

Figure 5:
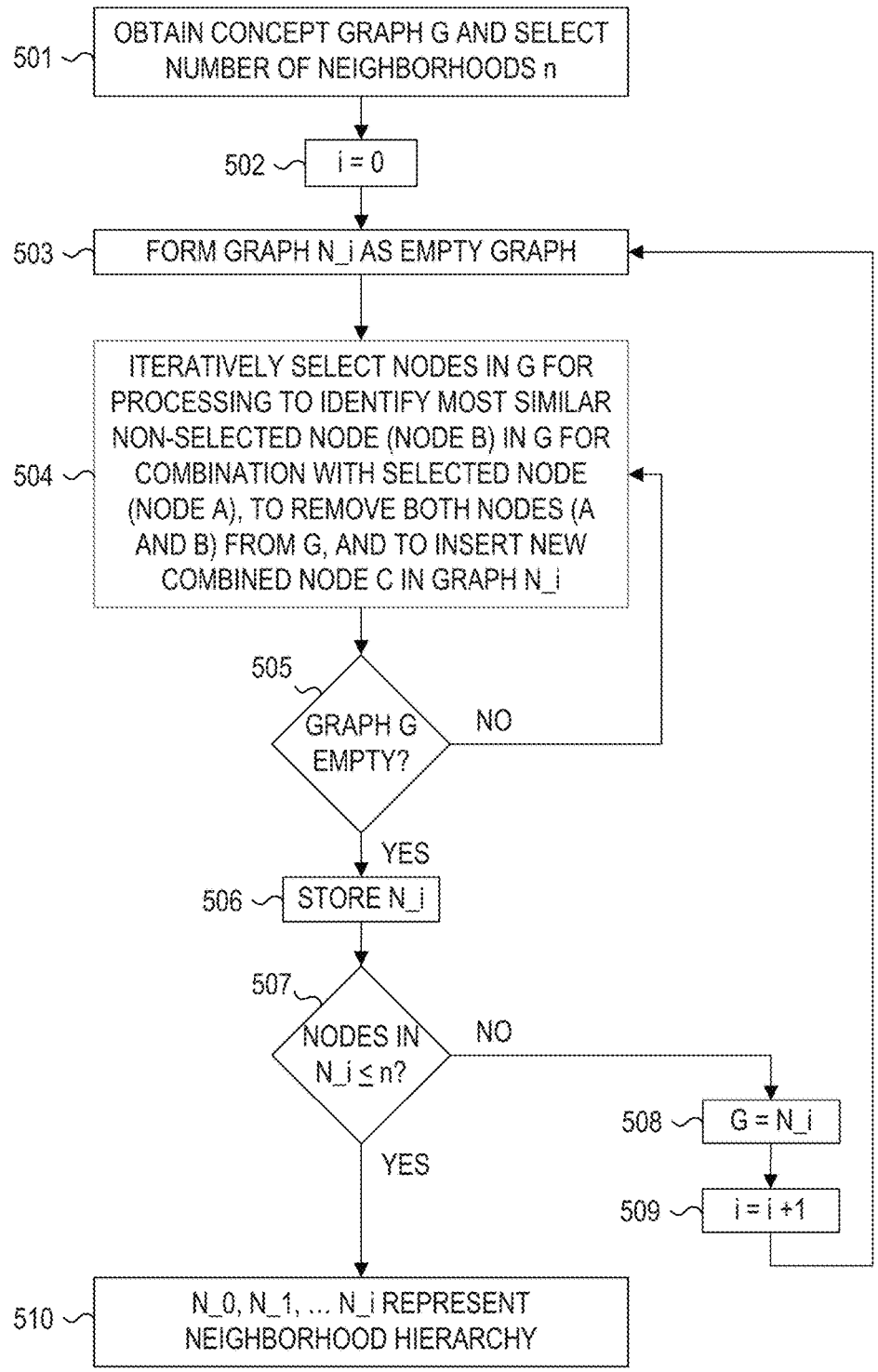
FIG. 5 illustrates a simplified flow chart showing the logic for generating neighborhood hierarchies.

To provide additional details for an improved understanding of selected embodiments of the present disclosure, reference is now made to FIG. 5 which depicts a simplified flow chart 500 showing the logic and method steps 501-510 for evaluating a set of concepts to generate neighborhood hierarchies. The processing shown in FIG. 5 may be performed in whole or in part by a cognitive system, such as the QA information handing system 16, QA system 100, or other natural language question answering system which uses concept vectors to generate and display neighborhood hierarchies among concept vectors.

FIG. 5 processing commences at step 501 by choosing, constructing, or otherwise obtaining a concept graph G and selecting the number of neighborhoods n to identify in the starting graph G. For example, a user may explore a concept graph having nodes which represent concepts (e.g., Wikipedia concepts) by requesting the user's browser to produce a hierarchy of concept neighborhoods, where each neighborhood can be understood by the user as a topic or common theme between the concepts that are measured to be connected to the neighborhood.

At step 502, a counter value i is initialized to a count value (e.g., i=0) to begin an iterative process beginning at step 503 with the formation of a first graph N_i as an empty graph. In the initialized state, the first graph N_i may be formed as an empty graph N_0 that is stored in a database (e.g., 106) or generated by the QA information handing system 16. As disclosed in the subsequent steps, the first graph N_0 will be processed to contain the graph of neighborhoods of G, and will contain half (½) of the number of nodes of G.

At step 504, nodes in the concept graph G are iteratively selected for processing so that, for each node (e.g., Node A), the most similar non-selected node (Node B) in the graph G is identified for combination with the selected node (Node A), and then both nodes (Nodes A and B) are removed or transferred from the concept graph G and inserted into the first graph N_0 as a new combined node (Node C). In selected embodiments, the iterative processing at step 504 may be performed at the QA system 100 using the QA information handing system 16 and similarity calculation engine 15 to remove both Nodes A and B (the selected node and its most similar node) from G, and then to place a new node (Node C) representing this combination in the first graph N_0. In selected embodiments, the processing at step 504 iteratively selects nodes from G, and every selected node (e.g., Node A), the out-neighbors and in-neighbors sets of the selected node are compared to every other non-selected node in G. Similarity can be defined as intersection between the out-neighbors and in-neighbors of two nodes which is computed using any desired similarity metrics, such as the SimRank and Jaccard similarity coefficients. For long as the graph G is not empty (negative outcome to detection step 505), the processing at step 504 is repeated to iterate the selected node (Node A) over all remaining nodes in the concept graph G to select a most similar node (Node B) which is combined with the selected node (Node A), remove the nodes (Nodes A, B) from the concept graph G, and then place the combined node (Node C) representing the nodes (Nodes A, B) into graph N_i. However, once the concept graph G is empty (affirmative outcome to detection step 505), the first graph N_i=N_0 is stored at step 506.

At step 507, the process determines if the number of nodes in N_i exceeds n—the number of desired neighborhoods. If so (negative outcome to detection step 507), the first graph N_i=N_0 is used to updated the concept graph G (at step 508). In addition, the count value i is incremented (step 509), and the steps 503-506 are iteratively repeated until the number of nodes in N_i is less than or equal to n (affirmative outcome to detection step 507).

Once the node threshold requirement of step 507 is met, the stored graphs N_0, N_1, ..., N_i representing the hierarchy of neighborhoods constructed from the concept graph G are processed at step 510. Such processing may include assigning a label to each neighborhood N_i for purposes of making the neighborhood (topic) more easily identified by a user. In selected embodiments, the neighborhood label assignment processing at step 510 may be performed at the QA system 100 using the QA information handing system 16 to sort the nodes of the concept graph G that are contained in each neighborhood node in N_i, where sorting is performed by popularity in the concept graph G. For example, popularity of nodes can be computed using PageRank algorithm in the concept graph G. Once sorted, the node with the highest page rank value may be selected and assigned as the representative label for the neighborhood.

The neighborhood processing at step 510 may also include processing to associate each concept in the concept graph G to different neighborhoods N_i. In selected embodiments, the concept-neighborhood association processing at step 510 may be performed at the QA system 100 using the QA information handing system 16 to process each node in the concept graph G using a probability flow traversal algorithm (such as personalized page rank) to score the probability of traversal from each node in the concept graph G to the selected representative node that formed the neighborhood in N_i. The proximity of the node in the concept graph G to the neighborhood identified in N is said to be the probability of traversal to the representative node in G. In this way, each node in the concept graph can be represented with a vector of cardinality size-of-N_i, with each entry of the vector quantifying the corresponding probability of the node traversing to the representative in N_i. As disclosed herein, vectors can be generated for each of the N_0, N_1, ..., N_i neighborhood graphs for subsequent hierarchical comparisons.

The neighborhood processing at step 510 may also include processing to cluster the concept vectors. In selected embodiments, the concept vector cluster processing at step 510 may be performed at the QA system 100 using the QA information handing system 16 to determine common neighborhoods between collections of concepts, such as by using standard clustering algorithms to cluster the vectorial representation of concepts in the N_i hierarchies. The search space can be traversed iteratively, starting from N_0, until all or most vectors are classified into a target number of clusters.

As disclosed herein, the iterative processing at steps 503-510 may be performed at the QA system 100 or vector processing applications 14 by using the QA information handing system 16 and similarity calculation engine 15 to discover neighborhood hierarchies from concept graphs using iterative clustering and probability flow-based traversals to identify, for each (concept) node in a graph G, an associated neighborhood and corresponding strength metric and to create a hierarchy of neighborhoods, each of which has an assigned or representative concept to enable a human user to easily identify the neighborhood.

By now, it will be appreciated that there is disclosed herein a system, method, apparatus, and computer program product for generating concept hierarchies with an information handling system having a processor and a memory. As disclosed, the system, method, apparatus, and computer program product generate at least a first concept set comprising one or more concepts extracted from one or more content sources. At the system, a user request is received to produce a hierarchy of concepts from the first concept set using one or more specified hierarchy parameters, which may be default parameters or parameters specified in the user request. A vector representation of each of the concepts in the first concept set is generated, retrieved, constructed, or otherwise obtained. The vectors are processed by performing a natural language processing (NLP) analysis comparison of the vector representation of each of the concepts in the first concept set to determine a similarity measure for each pair of distinct concepts $C_i$ and $C_j$ in the first concept set. The similarity measure may be defined on a selected subset of dimensions of the concept vectors with uniform or non-uniform weights, where the selected dimensions and their weights can be modified in each iterative step of hierarchy construction. In selected embodiments, the NLP analysis includes analyzing a vector similarity function $sim(V_i, V_j)$ between vectors $V_i, V_j$ representing each pair of distinct concepts $C_i$ and $C_j$ in the first concept set. In selected embodiments, analysis of the vector similarity function $sim(V_i, V_j)$ includes computing, for each concept $C_i$ for $i=1 \ldots N$, the similarity measure corresponding to said concept $C_i$ as a cosine distance measure between each vector pair $V_i, V_j$ for $j=1 \ldots N$, $i \neq j$, and then selecting a distinct, unconnected concept $C_j$ having a maximum cosine distance measure with the concept $C_i$. A concept hierarchy is constructed based on the one or more specified hierarchy parameters and the similarity measure for each pair of distinct concepts $C_i$ and $C_j$ in the first concept set. In selected embodiments, the concept hierarchy is constructed using a bottom-up method to iteratively build a concept graph by selecting distinct, unconnected concepts $C_i, C_j$ from the first concept set based on a maximal similarity measure and identifying a first concept as a hierarchy root which has a maximal number of occurrences in the first concept set. In other embodiments, the concept hierarchy is constructed using a top-down/frequency method to sort the one or more concepts in the first concept set into a sorted concept sequence based on frequency of occurrence, select a root node $C_1$ that has maximum frequency of occurrence, and sequentially add each concept from the sorted concept sequence to the root node $C_1$ in the concept hierarchy based on a maximal similarity measure between a selected concept from the sorted concept sequence and the root node $C_1$ in the concept hierarchy, or to another existing node $C_i$ in the concept hierarchy based on a maximal similarity measure between a selected concept in the sorted concept sequence and that other existing node $C_i$ in the concept hierarchy. In other embodiments, the concept hierarchy is constructed by generating a first sequence over a set of abstract concepts $C_1, \ldots, C_k$ by simulating a random walk on a first hierarchical structure defined by a first branching factor and specified depth; generating a second sequence over a set of regular concepts $D_1, \ldots, D_k$, where the sequence extracted from a corpus; generating or retrieving a vector representation for each of the concepts in the first sequence of abstract concepts and the second sequence of regular concepts; and identifying one or more pairs of regular concepts to approximate corresponding pairs of abstract concepts based on analogies of relationships between the abstract concepts and the regular concepts. In addition, the system may display the concept hierarchy to visually present inter-relations between concepts from the first concept set, such as by visually presenting a hierarchical structure conveying concept grouping of concepts from the first concept set to enable user navigation over the first concept set. In other embodiments, the system may iteratively select a concept from the first concept set; identify an associated neighborhood for each selected concept in the first concept set using iterative clustering and probability flow-based traversals to identify, for each concept in the first concept set, an associated neighborhood and corresponding strength measure; and create a hierarchy of associated neighborhoods, each of which comprises a representative concept to enable a human user to easily identify the neighborhood.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for generating concept hierarchies, the method comprising:
   generating, by the system, at least a first concept set comprising one or more concepts extracted from one or more content sources;
   receiving, by the system, a user request to produce a hierarchy of concepts from the first concept set using one or more specified hierarchy parameters;
   generating or retrieving, by the system, a vector representation of each of the concepts in the first concept set;
   performing, by the system, a natural language processing (NLP) analysis comparison of the vector representation of each of the concepts in the first concept set to determine a vector similarity measure for each pair of distinct concepts Ci and Cj in the first concept set; and
   constructing, by the system, a concept hierarchy based on the one or more specified hierarchy parameters and the vector similarity measure for each pair of distinct concepts Ci and Cj in the first concept set, where Ci and Cj are each indexed elements of the first concept set, wherein constructing the concept hierarchy comprises using a top-down method to sort the one or more concepts in the first concept set into a sorted concept sequence based on frequency of occurrence, select a root node C1 that has maximum frequency of occurrence, and sequentially add each concept from the sorted concept sequence to the root node C1 in the concept hierarchy based on a maximal vector similarity measure between a selected concept from the sorted concept sequence and the root node C1 in the concept hierarchy, or to another existing node Ci in the concept hierarchy based on a maximal vector similarity measure between a selected concept in the sorted concept sequence and that other existing node Ci in the concept hierarchy.

2. The method of claim 1, further comprising displaying, by the system, the concept hierarchy to visually present inter-relations between concepts from the first concept set.

3. The method of claim 1, further comprising displaying, by the system, the concept hierarchy to visually present a hierarchical structure conveying concept grouping of concepts from the first concept set to enable user navigation over the first concept set.

4. The method of claim 1, wherein one or more of the specified hierarchy parameters are specified in the user request.

5. The method of claim 1, wherein one or more of the specified hierarchy parameters are specified default parameters.

6. The method of claim 1, wherein performing the NLP analysis comprises analyzing a vector similarity function $sim(V_i, V_j)$ between vectors $V_i$, $V_j$ representing each pair of distinct concepts Ci and Cj in the first concept set.

7. The method of claim 6, wherein analyzing the vector similarity function $sim(V_i, V_j)$ comprises, for each concept Ci for $i=1 \ldots N$:
   computing, by the system, the vector similarity measure corresponding to said concept Ci as a cosine distance measure between each vector pair $V_i$, $V_j$ for $j=1 \ldots N$, and
   selecting a distinct, unconnected concept Cj having a maximum cosine distance measure with the concept Ci.

8. The method of claim 1, where the vector similarity measure is defined on a selected subset of dimensions of the concept vectors with uniform or non-uniform weights, where the selected dimensions and their weights can be modified in each iterative step of hierarchy construction.

9. An information handling system comprising:
   one or more processors;
   a memory coupled to at least one of the processors;
   a set of instructions stored in the memory and executed by at least one of the processors to generate concept hierarchies, wherein the set of instructions are executable to perform actions of:
   generating, by the system, at least a first concept set comprising one or more concepts extracted from one or more content sources;
   receiving, by the system, a user request to produce a hierarchy of concepts from the first concept set using one or more specified hierarchy parameters;
   generating or retrieving, by the system, a vector representation of each of the concepts in the first concept set;
   performing, by the system, a natural language processing (NLP) analysis comparison of the vector representation of each of the concepts in the first concept set to determine a vector similarity measure for each pair of distinct concepts Ci and Cj in the first concept set;
   constructing, by the system, a concept hierarchy based on the one or more specified hierarchy parameters and the vector similarity measure for each pair of distinct concepts Ci and Cj in the first concept set, wherein constructing the concept hierarchy comprises using a top-down method to sort the one or more concepts in the first concept set into a sorted concept sequence based on frequency of occurrence, select a root node C1 that has maximum frequency of occurrence, and sequentially add each concept from the sorted concept sequence to the root node C1 in the concept hierarchy based on a maximal vector similarity measure between a selected concept from the sorted concept sequence and the root node C1 in the concept hierarchy, or to another existing node Ci in the concept hierarchy based on a maximal vector similarity measure between a selected concept in the sorted concept sequence and that other existing node Ci in the concept hierarchy; and displaying, by the system, the concept hierarchy to visually present a hierarchical structure conveying concept grouping of concepts from the first concept set to enable user navigation over the first concept set, where Ci and Cj are each indexed elements of the first concept set.

10. The information handling system of claim 9, where the vector similarity measure is defined on a selected subset of dimensions of the concept vectors with uniform or non-uniform weights, where the selected dimensions and their weights can be modified in each iterative step of hierarchy construction.

11. A computer program product stored in a computer readable storage medium, comprising computer instructions that, when executed by an information handling system, causes the system to generate concept hierarchies by performing actions comprising:

generating, by the system, at least a first concept set comprising one or more concepts extracted from one or more content sources;

receiving, by the system, a user request to produce a hierarchy of concepts from the first concept set using one or more specified hierarchy parameters;

generating or retrieving, by the system, a vector representation of each of the concepts in the first concept set;

performing, by the system, a natural language processing (NLP) analysis comparison of the vector representation of each of the concepts in the first concept set to determine a vector similarity measure for each pair of distinct concepts Ci and Cj in the first concept set;

constructing, by the system, a concept hierarchy based on the one or more specified hierarchy parameters and the vector similarity measure for each pair of distinct concepts Ci and Cj in the first concept set, wherein constructing the concept hierarchy comprises using a top-down method to sort the one or more concepts in the first concept set into a sorted concept sequence based on frequency of occurrence, select a root node C1 that has maximum frequency of occurrence, and sequentially add each concept from the sorted concept sequence to the root node C1 in the concept hierarchy based on a maximal vector similarity measure between a selected concept from the sorted concept sequence and the root node C1 in the concept hierarchy, or to another existing node Ci in the concept hierarchy based on a maximal vector similarity measure between a selected concept in the sorted concept sequence and that other existing node Ci in the concept hierarchy; and displaying, by the system, the concept hierarchy to visually present a hierarchical structure conveying concept grouping of concepts from the first concept set to enable user navigation over the first concept set, where Ci and Cj are each indexed elements of the first concept set.

12. The computer program product of claim 11, wherein constructing the concept hierarchy comprises using a bottom-up method to iteratively build a concept graph by selecting distinct, unconnected concepts Ci, Cj from the first concept set based on a maximal vector similarity measure and identifying a first concept as a hierarchy root which has a maximal number of occurrences in the first concept set.

13. The computer program product of claim 11, where the vector similarity measure is defined on a selected subset of dimensions of the concept vectors with uniform or non-uniform weights, where the selected dimensions and their weights can be modified in each iterative step of hierarchy construction.

* * * * *